US007386356B2

(12) United States Patent
Fay et al.

(10) Patent No.: US 7,386,356 B2
(45) Date of Patent: Jun. 10, 2008

(54) DYNAMIC AUDIO BUFFER CREATION

(75) Inventors: Todor J. Fay, Bellevue, WA (US); Brian L. Schmidt, Bellevue, WA (US); Dugan O. Porter, Redmond, WA (US); James F. Geist, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 10/093,099

(22) Filed: Mar. 5, 2002

(65) Prior Publication Data

US 2002/0133249 A1 Sep. 19, 2002

Related U.S. Application Data

(60) Provisional application No. 60/273,660, filed on Mar. 5, 2001.

(51) Int. Cl.
*G06F 17/00* (2006.01)

(52) U.S. Cl. ........................................................ 700/94

(58) Field of Classification Search .................. 700/94; 719/328, 321, 52, 53, 56, 310
See application file for complete search history.

(56) References Cited

U.S. PATENT DOCUMENTS

| | | | |
|---|---|---|---|
| 5,142,961 | A | 9/1992 | Paroutaud |
| 5,303,218 | A | 4/1994 | Miyake |
| 5,315,057 | A | 5/1994 | Land et al. |
| 5,331,111 | A | 7/1994 | O'Connell |
| 5,483,618 | A | 1/1996 | Johnson et al. |
| 5,511,002 | A | 4/1996 | Milne et al. |
| 5,548,759 | A | 8/1996 | Lipe |
| 5,565,908 | A | 10/1996 | Ahmad |
| 5,596,159 | A | 1/1997 | O'Connell |
| 5,717,154 | A | 2/1998 | Gulick |
| 5,734,119 | A | 3/1998 | France et al. |
| 5,761,684 | A | 6/1998 | Gibson |
| 5,768,545 | A | 6/1998 | Solomon et al. |
| 5,778,187 | A | 7/1998 | Monteiro et al. |
| 5,792,971 | A | 8/1998 | Timis et al. |
| 5,842,014 | A | 11/1998 | Brooks et al. |

(Continued)

OTHER PUBLICATIONS

Vercoe, et al; "Real-Time CSOUND: Software Synthesis with Sensing and Control"; ICMC Glasgow 1990 for the Computer Music Association; pp. 209 through 211.

(Continued)

*Primary Examiner*—Sinh Tran
*Assistant Examiner*—Andrew C Flanders
(74) *Attorney, Agent, or Firm*—Lee & Hayes, PLLC

(57) ABSTRACT

An audio generation system includes a buffer manager that creates audio buffers to receive streams of audio data from an audio data source, such as from a synthesizer component for example. The audio buffers include sink-in audio buffers that receive one or more streams of audio data when the streams of audio data are requested by the buffer manager for input to the sink-in audio buffers. The audio buffers also include mix-in audio buffers that receive streams of audio data from one or more of the sink-in audio buffers, and from any number of other mix-in audio buffers. The audio generation system includes an audio component, such as a speaker for example, that receives audio data from the sink-in audio buffers and produces an audio rendition corresponding to the audio data.

51 Claims, 7 Drawing Sheets

U.S. PATENT DOCUMENTS

| | | | |
|---|---|---|---|
| 5,852,251 | A | 12/1998 | Su et al. |
| 5,890,017 | A | 3/1999 | Tulkoff et al. |
| 5,902,947 | A | 5/1999 | Burton et al. |
| 5,942,707 | A | 8/1999 | Tamura |
| 5,977,471 | A | 11/1999 | Rosenzweig |
| 5,990,879 | A | 11/1999 | Mince |
| 6,044,408 | A | 3/2000 | Engstrom et al. |
| 6,100,461 | A | 8/2000 | Hewitt |
| 6,152,856 | A | 11/2000 | Studor et al. |
| 6,160,213 | A | 12/2000 | Arnold et al. |
| 6,169,242 | B1 | 1/2001 | Fay et al. |
| 6,173,317 | B1 | 1/2001 | Chaddha et al. |
| 6,175,070 | B1 | 1/2001 | Naples et al. |
| 6,180,863 | B1 | 1/2001 | Tamura |
| 6,216,149 | B1 | 4/2001 | Conner et al. |
| 6,225,546 | B1 | 5/2001 | Kraft et al. |
| 6,233,389 | B1 | 5/2001 | Barton et al. |
| 6,301,603 | B1 | 10/2001 | Maher et al. |
| 6,357,039 | B1 | 3/2002 | Kuper |
| 6,433,266 | B1 | 8/2002 | Fay et al. |
| 6,541,689 | B1 | 4/2003 | Fay et al. |
| 6,628,928 | B1 | 9/2003 | Crosby et al. |
| 6,640,257 | B1 | 10/2003 | MacFarlane |
| 6,658,309 | B1 | 12/2003 | Abrams et al. |
| 2001/0053944 | A1 | 12/2001 | Marks et al. |
| 2002/0108484 | A1 | 8/2002 | Arnold et al. |
| 2002/0144587 | A1 | 10/2002 | Naples et al. |
| 2002/0144588 | A1 | 10/2002 | Naples et al. |

OTHER PUBLICATIONS

Harris, et al.; “The Application of Embedded Transputers in a Professional Digital Audio Mixing System”; IEEE Colloquium on “Transputer Applications”; Digest No. 129, 2/ 1-3 (uk Nov. 13, 1989).

Vercoe, Barry; “New Dimensions in Computer Music”; Trends & Perspectives in Signal Processing; Focus, Apr. 1982; pp. 15 through 23.

Moorer, James; “The Lucasfilm Audio Signal Processor”; Computer Music Journal, vol. 6, No. 3, Fall 1982, 0148-9267/82/030022-11; pp. 22 through 32.

J. Piche et al., “Cecilia: A Production Interface to Csound”, Computer Music Journal vol. 22, No. 2 pp. 52-55 (Summer 1998).

A. Camurri et al., “A Software Architecture for Sound and Music Processing”, Microprocessing and Microprogramming vol. 35 pp. 625-632 (Sep. 1992).

Berry M., “An Introduction to GrainWave” Computer Music Journal Spring 1999 vol. 23 No. 1 pp. 57-61.

H. Meeks, “Sound Forge Version 4.0b”, Social Science Computer Review vol. 16, No. 2, pp. 205-208 (Summer 1998).

M. Cohen et al., “Multidimensional Audio Window Management”, Int. J. Man-Machine Studies vol. 34, No. 3 pp. 319-336 (1991).

Malham et al., “3-D Sound Spatialization using Ambisonic Techniques” Computer Music Journal Winter 1995 vol. 19 No. 4 pp. 58-70.

Meyer D., “Signal Processing Architecture for Loudspeaker Array Directivity Control” ICASSP Mar. 1985 vol. 2 pp. 16.7.1-16.7.4.

Miller et al., “Audio-Enhanced Computer Assisted Learning and Computer Controlled Audio-Instruction”. Computer Education, Pergamon Press Ltd., 1983, vol. 7 pp. 33-54.

R. Dannenberg et al., “Real-time Software Synthesis on Superscalar Architectures”, Computer Music Journal vol. 21, No. 3 pp. 83-94 (Fall 1997).

R. Nieberle et al., “CAMP: Computer-Aided Music Processing”, Computer Music Journal vol. 15, No. 2, pp. 33-40 (Summer 1991).

Reilly et al., “Interactive DSP Debugging in the Multi-Processor Huron Environment” ISSPA Aug. 1996 pp. 270-273.

Stanojevic et al., “The Total Surround Sound (TSS) Processor” SMPTE Journal Nov. 1994 vol. 3 No. 11 pp. 734-740.

V. Ulianich, “Project FORMUS: Sonoric Space-Time and the Artistic Synthesis of Sound”, Leonardo vol. 28, No. 1 pp. 63-66 (1995).

Waid, Fred; “APL and the Media”; Proceedings of the Tenth APL as a Tool of Thought Conference; held at Stevens Institute of Technology, Hoboken, New Jersey, Jan. 31, 1998; pp. 111 through 122.

Wippler, Jean-Claude; “Scripted Documents”; Proceedings of the 7th USENIX Tcl/TKConference; Austin Texas; Feb. 14-18, 2000; The USENIX Association.

Bargen, et al., “Inside DirectX”, Microsoft Press, 1998, pp. 203-226.

DYNAMIC AUDIO BUFFER CREATION

RELATED APPLICATION

This application claims the benefit of U.S. Provisional Application No. 60/273,660, filed Mar. 5, 2001, entitled "Dynamic Buffer Creation with Embedded Hardware and Software Effects", to Todor Fay et al., which is incorporated by reference herein.

TECHNICAL FIELD

This invention relates to audio processing with an audio generation system and, in particular, to dynamic audio buffer creation.

BACKGROUND

Multimedia programs present content to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated into electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources when streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file, to generate audio sound waves. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other commands to control a synthesizer.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions themselves carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each MIDI channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run-time rather than stored in memory. The data describing an instrument can be downloaded to a synthesizer and then played like any other MIDI instrument. Because DLS data can be distributed as part of an application, developers can be assured that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

Conventional Audio and Music System

FIG. 1 illustrates a conventional audio and music generation system 100 that includes a synthesizer 102, a sound effects input source 104, and a buffers component 106. Typically, a synthesizer is implemented in computer software, in hardware as part of a computer's internal sound card, or as an external device such as a MIDI keyboard or module. Synthesizer 102 receives MIDI inputs on sixteen channels 108 that conform to the MIDI standard. Synthesizer 102 includes a mixing component 110 that mixes the audio sound wave data output from synthesizer channels 108. An output 112 of mixing component 110 is input to an audio buffer in the buffers component 106.

MIDI inputs to synthesizer 102 are in the form of individual instructions, each of which designates the MIDI channel to which it applies. Within synthesizer 102, instructions associated with different channels 108 are processed in different ways, depending on the programming for the various channels. A MIDI input is typically a serial data stream that is parsed in synthesizer 102 into MIDI instructions and synthesizer control information. A MIDI command or instruction is represented as a data structure containing information about the sound effect or music piece such as the pitch, relative volume, duration, and the like.

A MIDI instruction, such as a "note-on", directs synthesizer 102 to play a particular note, or notes, on a synthesizer channel 108 having a designated instrument. The General MIDI standard defines standard sounds that can be combined and mapped into the sixteen separate instrument and sound channels. A MIDI event on a synthesizer channel 108 corresponds to a particular sound and can represent a keyboard key stroke, for example. The "note-on" MIDI instruction can be generated with a keyboard when a key is pressed and the "note-on" instruction is sent to synthesizer 102. When the key on the keyboard is released, a corresponding "note-off" instruction is sent to stop the generation of the sound corresponding to the keyboard key.

The audio representation for a video game involving a car, from the perspective of a person in the car, can be presented for an interactive video and audio presentation. The sound effects input source 104 has audio data that represents various sounds that a driver in a car might hear. A MIDI formatted music piece 114 represents the audio of the car's stereo. Input source 104 also has digital audio sample inputs that are sound effects representing the car's horn 116, the car's tires 118, and the car's engine 120.

The MIDI formatted input 114 has sound effect instructions 122(1-3) to generate musical instrument sounds. Instruction 122(1) designates that a guitar sound be generated on MIDI channel one (1) in synthesizer 102, instruction 120(2) designates that a bass sound be generated on MIDI channel two (2), and instruction 120(3) designates that drums be generated on MIDI channel ten (10). The MIDI channel assignments are designated when MIDI input 114 is authored, or created.

A conventional software synthesizer that translates MIDI instructions into audio signals does not support distinctly separate sets of MIDI channels. The number of sounds that can be played simultaneously is limited by the number of channels and resources available in the synthesizer. In the event that there are more MIDI inputs than there are available channels and resources, one or more inputs are suppressed by the synthesizer.

The buffers component 106 of audio system 100 includes multiple buffers 124(1-4). Typically, a buffer is an allocated area of memory that temporarily holds sequential samples of audio sound wave data that will be subsequently communicated to a sound card or similar audio rendering device to produce audible sound. The output 112 of synthesizer mixing component 110 is input to buffer 124(1) in buffers component 106. Similarly, each of the other digital sample sources are input to a buffer 124 in buffers component 106. The car horn sound effect 116 is input to buffer 124(2), the tires sound effect 118 is input to buffer 124(3), and the engine sound effect 120 is input to buffer 124(4).

Another problem with conventional audio generation systems is the extent to which system resources have to be allocated to support an audio representation for a video presentation. In the above example, each buffer 124 requires separate hardware channels, such as in a soundcard, to render the audio sound effects from input source 104. Further, in an audio system that supports both music and sound effects, a single stereo output pair that is input to one buffer is a limitation to creating and enhancing the music and sound effects.

Similarly, other three-dimensional (3-D) audio spatialization effects are difficult to create and require an allocation of system resources that may not be available when processing a video game that requires an extensive audio presentation. For example, to represent more than one car from a perspective of standing near a road in a video game, a pre-authored car engine sound effect 120 has to be stored in memory once for each car that will be represented. Additionally, a separate buffer 124 and separate hardware channels will need to be allocated for each representation of a car. If a computer that is processing the video game does not have the resources available to generate the audio representation that accompanies the video presentation, the quality of the presentation will be deficient.

SUMMARY

An audio generation system includes a buffer manager that creates audio buffers to receive streams of audio data from an audio data source, such as from a synthesizer component, for example. The audio buffers include sink-in audio buffers that receive one or more streams of audio data when the streams of audio data are requested by the buffer manager for input to the sink-in audio buffers. The audio buffers also include mix-in audio buffers that receive streams of audio data from one or more of the sink-in audio buffers, and from any number of other mix-in audio buffers. The audio generation system includes an audio component, such as a speaker for example, that receives audio data from the sink-in audio buffers and produces an audio rendition corresponding to the audio data.

In one embodiment, the audio buffers are instantiated as programming objects, each having an interface that is callable by a software component, such as a multimedia application for example. Further, computing system resources are first reserved to implement a mix-in audio buffer before computing system resources are reserved to implement any sink-in audio buffers that input audio data to the mix-in audio buffer. Subsequently, the computing system resources reserved to implement the sink-in audio buffers are released before the computing system resources that implement the mix-in audio buffer are released.

BRIEF DESCRIPTION OF THE DRAWINGS

The same numbers are used throughout the drawings to reference like features and components.

DETAILED DESCRIPTION

The following describes systems and methods to implement dynamic audio buffers in an audio generation system that supports numerous computing systems' audio technologies, including technologies that are designed and implemented after a multimedia application program has been authored. An application program instantiates the components of an audio generation system to produce, or otherwise generate, audio data that can be rendered with an audio rendering device to produce audible sound.

Dynamic audio buffer creation describes implementing audio buffers as needed in an audio generation system. Computing system resource allocation to create the audio buffers in hardware and/or software is dynamic as necessitated by a requesting application program, such as a video game or other multimedia application. An application program can optimally utilize system hardware and software resources by creating and allocating audio buffers only when needed.

An audio generation system includes an audio rendition manager (also referred to herein as an "AudioPath") that is implemented to provide various audio data processing components that process audio data into audible sound. The audio generation system described herein simplifies the process of creating audio representations for interactive applications such as video games and Web sites. The audio rendition manager manages the audio creation process and integrates both digital audio samples and streaming audio.

Additionally, an audio rendition manager provides real-time, interactive control over the audio data processing for audio representations of video presentations. An audio rendition manager also enables 3-D audio spatialization processing for an individual audio representation of an entity's video presentation. Multiple audio renditions representing multiple video entities can be accomplished with multiple audio rendition managers, each representing a video entity, or audio renditions for multiple entities can be combined in a single audio rendition manager.

Real-time control of audio data processing components in an audio generation system is useful, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Exemplary Audio Generation System

Figure 1:
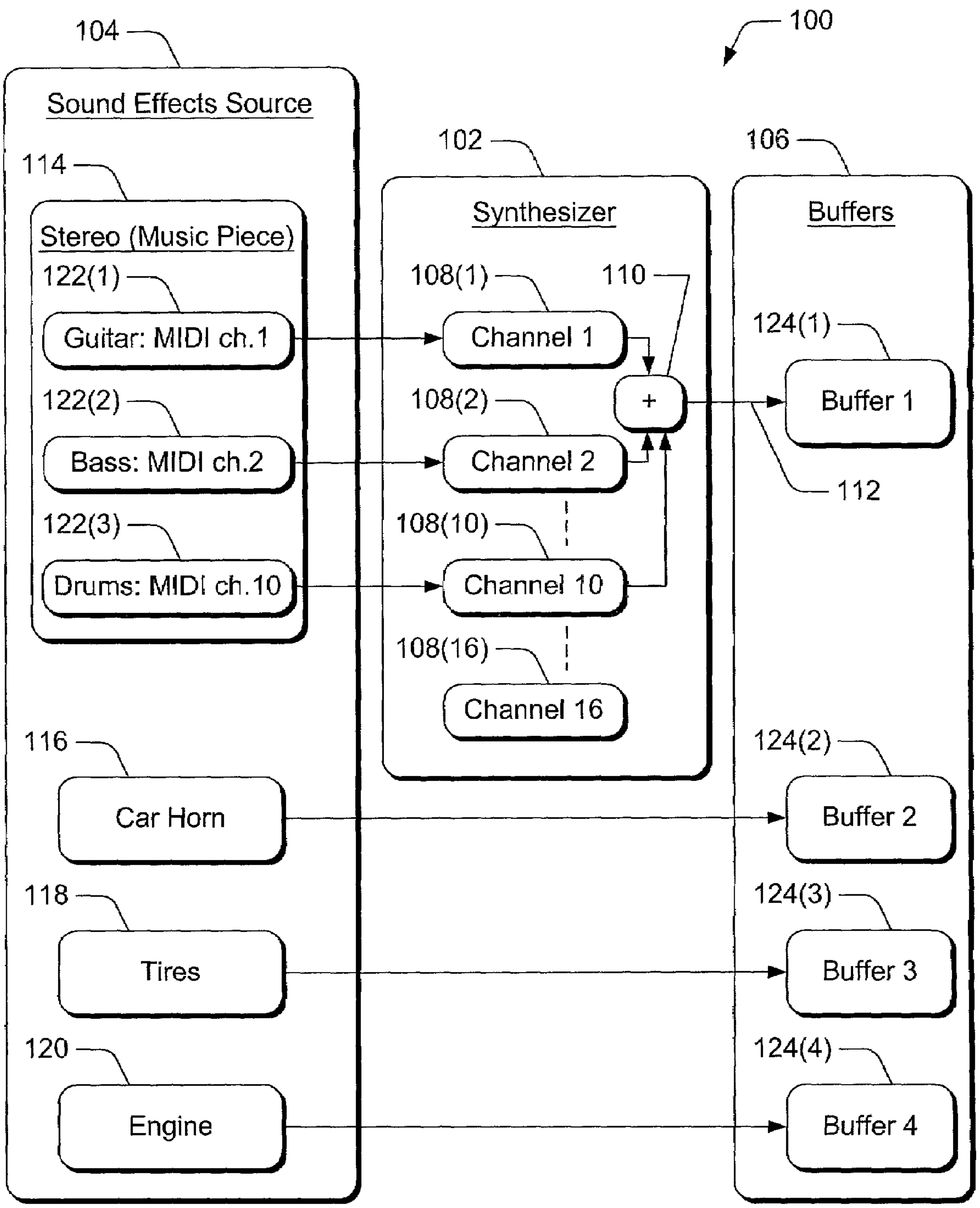
Fig. 1 Prior Art
FIG. 1 illustrates a conventional audio generation system.
Figure 2:
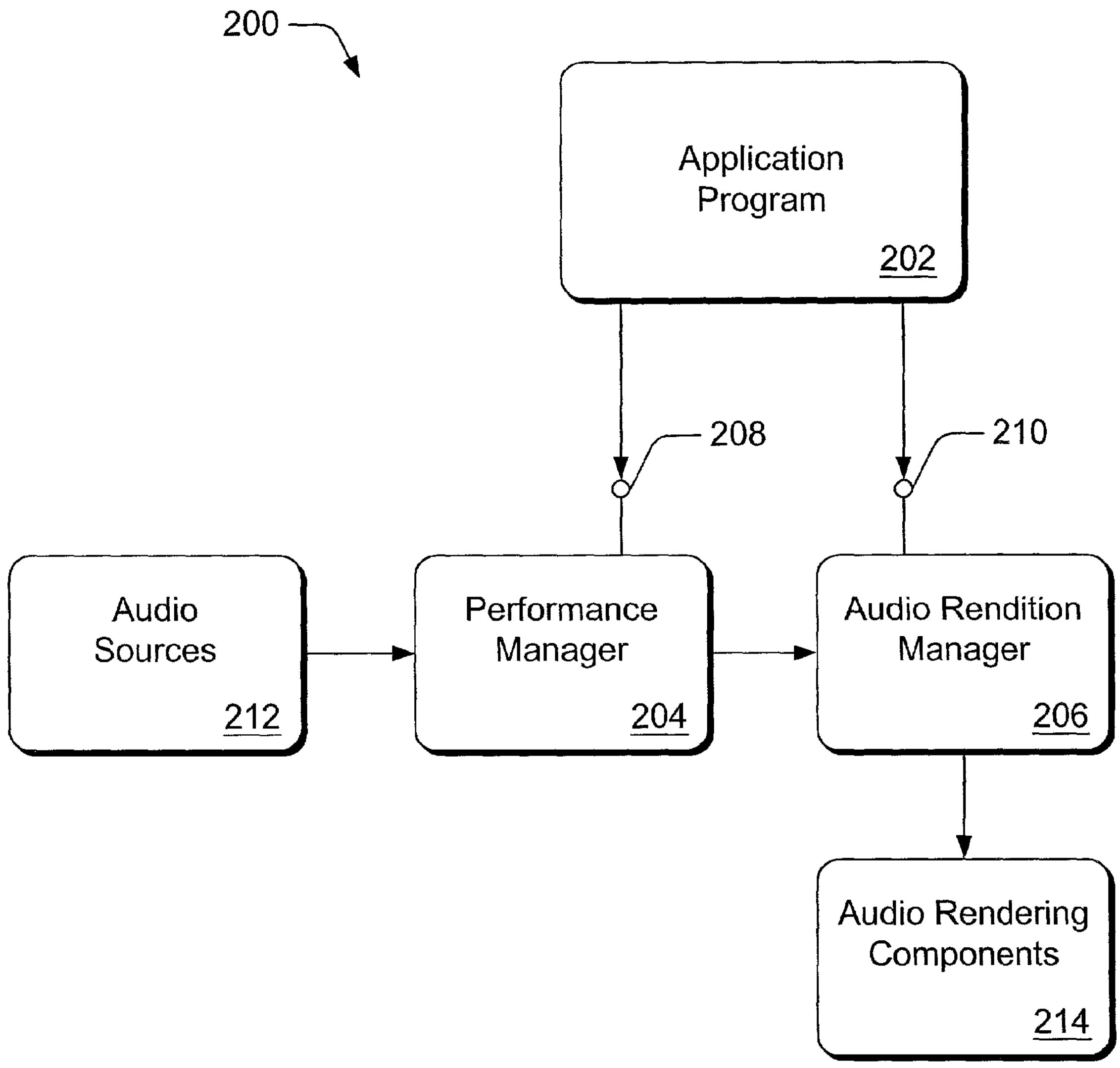
FIG. 2 illustrates various components of an exemplary audio generation system.

FIG. 2 illustrates an audio generation system 200 having components that can be implemented within a computing device, or the components can be distributed within a computing system having more than one computing device. The audio generation system 200 generates audio events that are processed and rendered by separate audio processing components of a computing device or system. See the description of "Exemplary Computing System and Environment" below for specific examples and implementations of network and computing systems, computing devices, and components that can be used to implement the technology described herein.

Audio generation system 200 includes an application program 202, a performance manager component 204, and an audio rendition manager 206. Application program 202 is one of a variety of different types of applications, such as a video game program, some other type of entertainment program, or any other application that incorporates an audio representation with a video presentation.

The performance manager 204 and the audio rendition manager 206 can be instantiated, or provided, as programming objects. The application program 202 interfaces with the performance manager 204, the audio rendition manager 206, and the other components of the audio generation system 200 via application programming interfaces (APIs). For example, application program 202 can interface with the performance manager 204 via API 208 and with the audio rendition manager 206 via API 210.

The various components described herein, such as the performance manager 204 and the audio rendition manager 206, can be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that the audio generation systems and the various components described herein are not limited to a COM and/or OLE implementation, or to any other specific programming technique.

The audio generation system 200 includes audio sources 212 that provide digital samples of audio data such as from a wave file (i.e., a .wav file), message-based data such as from a MIDI file or a pre-authored segment file, or an audio sample such as a Downloadable Sound (DLS). Audio sources can be also be stored as a resource component file of an application rather than in a separate file.

Application program 202 can initiate that an audio source 212 provide audio content input to performance manager 204. The performance manager 204 receives the audio content from audio sources 212 and produces audio instructions for input to the audio rendition manager 206. The audio rendition manager 206 receives the audio instructions and generates audio sound wave data. The audio generation system 200 includes audio rendering components 214 which are hardware and/or software components, such as a speaker or soundcard, that renders audio from the audio sound wave data received from the audio rendition manager 206.

Figure 3:
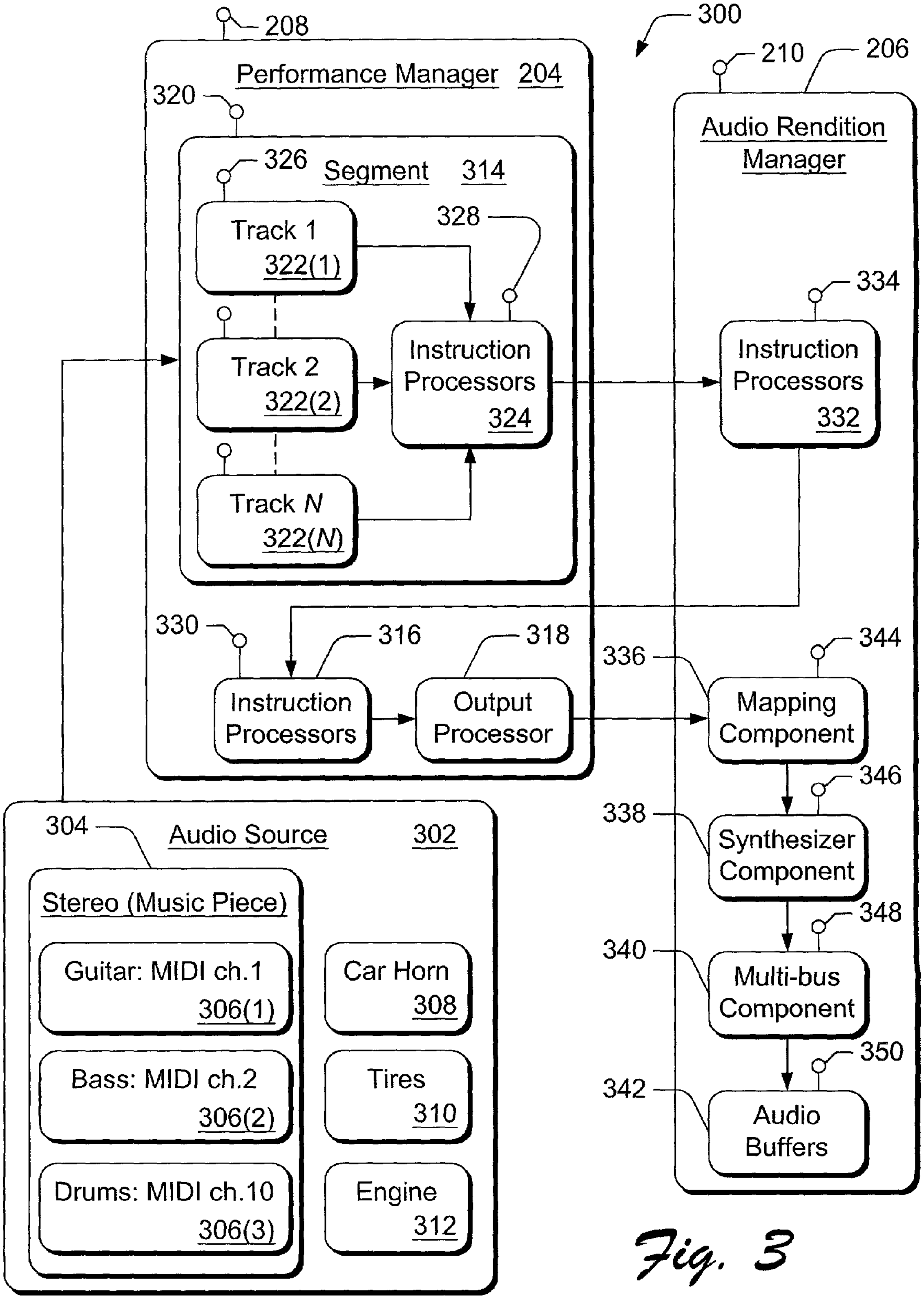
FIG. 3 illustrates various components of the audio generation system shown in FIG. 2.

FIG. 3 illustrates a performance manager 204 and an audio rendition manager 206 as part of an audio generation system 300. An audio source 302 provides sound effects for an audio representation of various sounds that a driver of a car might hear in a video game, for example. The various sound effects can be presented to enhance the perspective of a person sitting in the car for an interactive video and audio presentation.

The audio source 302 has a MIDI formatted music piece 304 that represents the audio of a car stereo. The MIDI input 304 has sound effect instructions 306(1-3) to generate musical instrument sounds. Instruction 306(1) designates that a guitar sound be generated on MIDI channel one (1) in a synthesizer component, instruction 306(2) designates that a bass sound be generated on MIDI channel two (2), and instruction 306(3) designates that drums be generated on MIDI channel ten (10). Input audio source 302 also has digital audio sample inputs that represent a car horn sound effect 308, a tires sound effect 310, and an engine sound effect 312.

The performance manager 204 can receive audio content from a wave file (i.e., .wav file), a MIDI file, or a segment file authored with an audio production application, such as DirectMusic® Producer, for example. DirectMusic® Producer is an authoring tool for creating interactive audio content and is available from Microsoft Corporation of Redmond, Washington. Additionally, performance manager 204 can receive audio content that is composed at run-time from different audio content components.

Performance manager 204 receives audio content input from input audio source 302 and produces audio instructions for input to the audio rendition manager 206. Performance manager 204 includes a segment component 314, an instruction processors component 316, and an output processor 318. The segment component 314 represents the audio content input from audio source 302. Although performance manager 204 is shown having only one segment 314, the performance manager can have a primary segment and any number of secondary segments. Multiple segments can be arranged concurrently and/or sequentially with performance manager 204.

Segment component 314 can be instantiated as a programming object having one or more interfaces 320 and associated interface methods. In the described embodiment, segment object 314 is an instantiation of a COM object class and represents an audio or musical piece. An audio segment represents a linear interval of audio data or a music piece and is derived from the inputs of an audio source which can be digital audio data, such as the engine sound effect 312 in audio source 302, or event-based data, such as the MIDI formatted input 304.

Segment component 314 has track components 322(1) through 322(N), and an instruction processors component 324. Segment 314 can have any number of track components 322 and can combine different types of audio data in the segment with different track components. Each type of audio data corresponding to a particular segment is contained in a track component 322 in the segment, and an audio segment is generated from a combination of the tracks in the segment. Thus, segment 314 has a track 322 for each of the audio inputs from audio source 302.

Each segment object contains references to one or a plurality of track objects. Track components 322(1) through 322(N) can be instantiated as programming objects having one or more interfaces 326 and associated interface methods. The track objects 322 are played together to render the audio and/or musical piece represented by segment object 314 which is part of a larger overall performance. When first instantiated, a track object does not contain actual music or audio performance data, such as a MIDI instruction sequence. However, each track object has a stream input/output (I/O) interface method through which audio data is specified.

The track objects 322(1) through 322(N) generate event instructions for audio and music generation components when performance manager 204 plays the segment 314. Audio data is routed through the components in the performance manager 204 in the form of event instructions which contain information about the timing and routing of the audio data. The event instructions are routed between and through the components in performance manager 204 on designated performance channels. The performance channels are allocated as needed to accommodate any number of audio input sources and to route event instructions.

To play a particular audio or musical piece, performance manager 204 calls segment object 314 and specifies a time interval or duration within the musical segment. The segment object in turn calls the track play methods of each of its track objects 322, specifying the same time interval. The track objects 322 respond by independently rendering event instructions at the specified interval. This is repeated, designating subsequent intervals, until the segment has finished its playback over the specified duration.

The event instructions generated by a track 322 in segment 314 are input to the instruction processors component 324 in the segment. The instruction processors component 324 can be instantiated as a programming object having one or more interfaces 328 and associated interface methods. The instruction processors component 324 has any number of individual event instruction processors (not shown) and represents the concept of a "graph" that specifies the logical relationship of an individual event instruction processor to another in the instruction processors component. An instruction processor can modify an event instruction and pass it on, delete it, or send a new instruction.

The instruction processors component 316 in performance manager 204 also processes, or modifies, the event instructions. The instruction processors component 316 can be instantiated as a programming object having one or more interfaces 330 and associated interface methods. The event instructions are routed from the performance manager instruction processors component 316 to the output processor 318 which converts the event instructions to MIDI formatted audio instructions. The audio instructions are then routed to audio rendition manager 206.

The audio rendition manager 206 processes audio data to produce one or more instances of a rendition corresponding to an audio source, or audio sources. That is, audio content from multiple sources can be processed and played on a single audio rendition manager 206 simultaneously. Rather than allocating buffer and hardware audio channels for each sound, an audio rendition manager 206 can be instantiated, or otherwise defined, to process multiple sounds from multiple sources.

For example, a rendition of the sound effects in audio source 302 can be processed with a single audio rendition manager 206 to produce an audio representation from a spatialization perspective of inside a car. Additionally, the audio rendition manager 206 dynamically allocates hardware channels (e.g., audio buffers to stream the audio wave data) as needed and can render more than one sound through a single hardware channel because multiple audio events are pre-mixed before being rendered via a hardware channel.

The audio rendition manager 206 has an instruction processors component 332 that receives event instructions from the output of the instruction processors component 324 in segment 314 in the performance manager 204. The instruction processors component 332 in audio rendition manager 206 is also a graph of individual event instruction modifiers that process event instructions. Although not shown, the instruction processors component 332 can receive event instructions from any number of segment outputs. Additionally, the instruction processors component 332 can be instantiated as a programming object having one or more interfaces 334 and associated interface methods.

The audio rendition manager 206 also includes several component objects that are logically related to process the audio instructions received from output processor 318 of performance manager 204. The audio rendition manager 206 has a mapping component 336, a synthesizer component 338, a multi-bus component 340, and an audio buffers component 342.

Mapping component 336 can be instantiated as a programming object having one or more interfaces 344 and associated interface methods. The mapping component 336 maps the audio instructions received from output processor 318 in the performance manager 204 to synthesizer component 338. Although not shown, an audio rendition manager can have more than one synthesizer component. The mapping component 336 communicates audio instructions from multiple sources (e.g., multiple performance channel outputs from output processor 318) for input to one or more synthesizer components 338 in the audio rendition manager 206.

The synthesizer component 338 can be instantiated as a programming object having one or more interfaces 346 and associated interface methods. Synthesizer component 338 receives the audio instructions from output processor 318 via the mapping component 336. Synthesizer component 338 generates audio sound wave data from stored wavetable data in accordance with the received MIDI formatted audio instructions. Audio instructions received by the audio rendition manager 206 that are already in the form of audio wave data are mapped through to the synthesizer component 338, but are not synthesized.

A segment component that corresponds to audio content from a wave file is played by the performance manager 204 like any other segment. The audio data from a wave file is routed through the components of the performance manager on designated performance channels and is routed to the audio rendition manager 206 along with the MIDI formatted audio instructions. Although the audio content from a wave file is not synthesized, it is routed through the synthesizer component 338 and can be processed by MIDI controllers in the synthesizer.

The multi-bus component 340 can be instantiated as a programming object having one or more interfaces 348 and associated interface methods. The multi-bus component 340 routes the audio wave data from the synthesizer component 338 to the audio buffers component 342. The multi-bus component 340 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal.

The audio buffers component 342 is an audio data buffers manager that can be instantiated or otherwise provided as a programming object or objects having one or more interfaces 350 and associated interface methods. The audio buffers component 342 receives the audio wave data from synthesizer component 338 via the multi-bus component 340. Individual audio buffers, such as a hardware audio channel or a software representation of an audio channel, in the audio buffers component 342 receive the audio wave data and stream the audio wave data in real-time to an audio rendering device, such as a sound card, that produces an audio rendition represented by the audio rendition manager 206 as audible sound.

The various component configurations described herein support COM interfaces for reading and loading the configuration data from a file. To instantiate the components, an application program or a script file instantiates a component using a COM function. The components of the audio generation systems described herein are implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

Exemplary Audio Rendition Components

Figure 4:
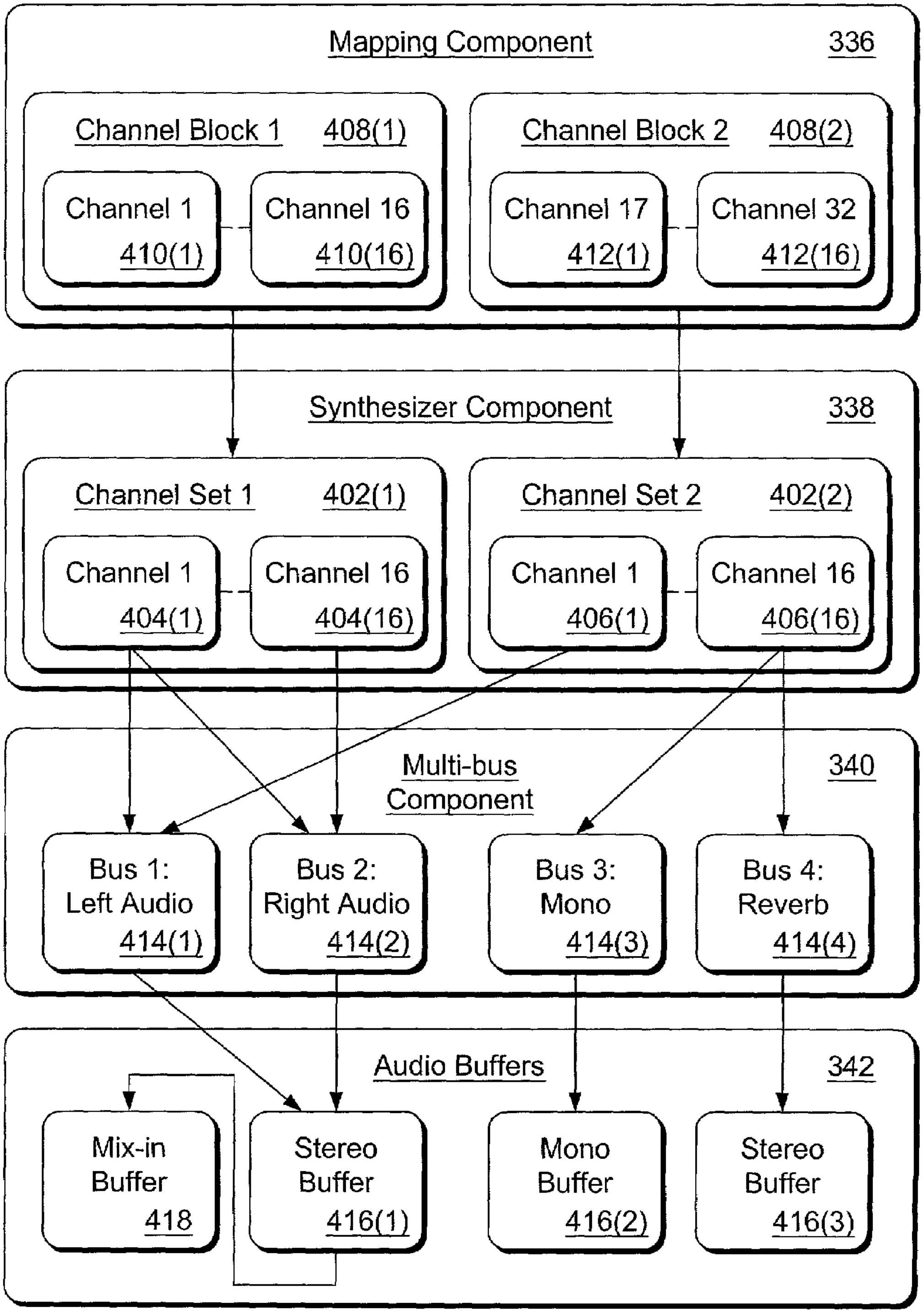
FIG. 4 illustrates various components of the audio generation system shown in FIG. 3.

FIG. 4 illustrates various audio data processing components of the audio rendition manager 206 in accordance with an implementation of the audio generation systems described herein. Details of the mapping component 336, synthesizer component 338, multi-bus component 340, and the audio buffers component 342 (FIG. 3) are illustrated, as well as a logical flow of audio data instructions through the components.

Synthesizer component 338 has two channel sets 402(1) and 402(2), each having sixteen MIDI channels 404(1-16) and 406(1-16), respectively. Those skilled in the art will recognize that a group of sixteen MIDI channels can be identified as channels zero through fifteen (0-15). For consistency and explanation clarity, groups of sixteen MIDI channels described herein are designated in logical groups of one through sixteen (1-16). A synthesizer channel is a communications path in synthesizer component 338 represented by a channel object. A channel object has APIs and associated interface methods to receive and process MIDI formatted audio instructions to generate audio wave data that is output by the synthesizer channels.

To support the MIDI standard, and at the same time make more MIDI channels available in a synthesizer to receive MIDI inputs, channel sets are dynamically created as needed. As many as 65,536 channel sets, each containing sixteen channels, can be created and can exist at any one time for a total of over one million available channels in a synthesizer component. The MIDI channels are also dynamically allocated in one or more synthesizers to receive multiple audio instruction inputs. The multiple inputs can then be processed at the same time without channel overlapping and without channel clashing. For example, two MIDI input sources can have MIDI channel designations that designate the same MIDI channel, or channels. When audio instructions from one or more sources designate the same MIDI channel, or channels, the audio instructions are routed to a synthesizer channel 404 or 406 in different channel sets 402(1) or 402(2), respectively.

Mapping component 336 has two channel blocks 408(1) and 408(2), each having sixteen mapping channels to receive audio instructions from output processor 318 in the performance manager 204. The first channel block 408(1) has sixteen mapping channels 410(1-16) and the second channel block 408(2) has sixteen mapping channels 412(1-16). The channel blocks 408 are dynamically created as needed to receive the audio instructions. The channel blocks 408 each have sixteen channels to support the MIDI standard and the mapping channels are identified sequentially. For example, the first channel block 408(1) has mapping channels one through sixteen (1-16) and the second channel block 408(2) has mapping channels seventeen through thirty-two (17-32). A subsequent third channel block would have sixteen channels thirty-three through forty-eight (33-48).

Each channel block 408 corresponds to a synthesizer channel set 402, and each mapping channel in a channel block maps directly to a synthesizer channel in a synthesizer channel set. For example, the first channel block 408(1) corresponds to the first channel set 402(1) in synthesizer component 338. Each mapping channel 410(1-16) in the first channel block 408(1) corresponds to each of the sixteen synthesizer channels 404(1-16) in channel set 402(1). Additionally, channel block 408(2) corresponds to the second channel set 402(2) in synthesizer component 338. A third channel block can be created in mapping component 336 to correspond to a first channel set in a second synthesizer component (not shown).

Mapping component 336 allows multiple audio instruction sources to share available synthesizer channels, and dynamically allocating synthesizer channels allows multiple source inputs at any one time. Mapping component 336 receives the audio instructions from output processor 318 in the performance manager 204 so as to conserve system resources such that synthesizer channel sets are allocated only as needed. For example, mapping component 336 can receive a first set of audio instructions on mapping channels 410 in the first channel block 408 that designate MIDI channels one (1), two (2), and four (4) which are then routed to synthesizer channels 404(1), 404(2), and 404(4), respectively, in the first channel set 402(1).

When mapping component 336 receives a second set of audio instructions that designate MIDI channels one (1), two (2), three (3), and ten (10), the mapping component routes the audio instructions to synthesizer channels 404 in the first channel set 402(1) that are not currently in use, and then to synthesizer channels 406 in the second channel set 402(2). For example, the audio instruction that designates MIDI channel one (1) is routed to synthesizer channel 406(1) in the second channel set 402(2) because the first MIDI channel 404(1) in the first channel set 402(1) already has an input from the first set of audio instructions. Similarly, the audio instruction that designates MIDI channel two (2) is routed to synthesizer channel 406(2) in the second channel set 402(2) because the second MIDI channel 404(2) in the first channel set 402(1) already has an input. The mapping component 336 routes the audio instruction that designates MIDI channel three (3) to synthesizer channel 404(3) in the first channel set 402(1) because the channel is available and not currently in use. Similarly, the audio instruction that designates MIDI channel ten (10) is routed to synthesizer channel 404(10) in the first channel set 402(1).

When particular synthesizer channels are no longer needed to receive MIDI inputs, the resources allocated to create the synthesizer channels are released as well as the resources allocated to create the channel set containing the synthesizer channels. Similarly, when unused synthesizer channels are released, the resources allocated to create the channel block corresponding to the synthesizer channel set are released to conserve resources.

Multi-bus component 340 has multiple logical buses 414(1-4). A logical bus 414 is a logic connection or data communication path for audio wave data received from synthesizer component 338. The logical buses 414 receive audio wave data from the synthesizer channels 404 and 406 and route the audio wave data to the audio buffers component 342. Although the multi-bus component 340 is shown having only four logical buses 414(1-4), it is to be appreciated that the logical buses are dynamically allocated as needed, and released when no longer needed. Thus, the multi-bus component 340 can support any number of logical buses at any one time as needed to route audio wave data from synthesizer component 338 to the audio buffers component 342.

The audio buffers component 342 includes three buffers 416(1-3) that receive the audio wave data output by synthesizer component 338. The buffers 416 receive the audio wave data via the logical buses 414 in the multi-bus component 340. An audio buffer 416 receives an input of audio wave data from one or more logical buses 414, and streams the audio wave data in real-time to a sound card or similar audio rendering device. An audio buffer 416 can also process the audio wave data input with various effects-processing (i.e., audio data processing) components before sending the data to be further processed and/or rendered as audible sound. The effects processing components are created as part of a buffer 416 and a buffer can have one or more effects processing components that perform functions such as control pan, volume, 3-D spatialization, reverberation, echo, and the like.

The audio buffers component 342 includes three types of buffers. The input buffers 416 receive the audio wave data output by the synthesizer component 338. A mix-in buffer 418 receives data from any of the other buffers, can apply effects processing, and mix the resulting wave forms. For example, mix-in buffer 418 receives an input from input buffer 416(1). Mix-in buffer 418, or mix-in buffers, can be used to apply global effects processing to one or more outputs from the input buffers 416. The outputs of the input buffers 416 and the output of the mix-in buffer 418 are input to a primary buffer (not shown) that performs a final mixing of all of the buffer outputs before sending the audio wave data to an audio rendering device.

The audio buffers component 342 includes a two channel stereo buffer 416(1) that receives audio wave data input from logic buses 414(1) and 414(2), a single channel mono buffer 416(2) that receives audio wave data input from logic bus 414(3), and a single channel reverb stereo buffer 416(3) that receives audio wave data input from logic bus 414(4). Each logical bus 414 has a corresponding bus function identifier that indicates the designated effects-processing function of the particular buffer 416 that receives the audio wave data output from the logical bus. For example, a bus function identifier can indicate that the audio wave data output of a corresponding logical bus will be to a buffer 416 that functions as a left audio channel such as from bus 414(1), a right audio channel such as from bus 414(2), a mono channel such as from bus 414(3), or a reverb channel such as from bus 414(4). Additionally, a logical bus can output audio wave data to a buffer that functions as a three-dimensional (3-D) audio channel, or output audio wave data to other types of effects-processing buffers.

A logical bus 414 can have more than one input, from more than one synthesizer, synthesizer channel, and/or audio source. Synthesizer component 338 can mix audio wave data by routing one output from a synthesizer channel 404 and 406 to any number of logical buses 414 in the multi-bus component 340. For example, bus 414(1) has multiple inputs from the first synthesizer channels 404(1) and 406(1) in each of the channel sets 402(1) and 402(2), respectively. Each logical bus 414 outputs audio wave data to one associated buffer 416, but a particular buffer can have more than one input from different logical buses. For example, buses 414(1) and 414(2) output audio wave data to one designated buffer. The designated buffer 416(1), however, receives the audio wave data output from both buses.

Although the audio buffers component 342 is shown having only three input buffers 416(1-3) and one mix-in buffer 418, it is to be appreciated that there can be any number of audio buffers dynamically allocated as needed to receive audio wave data at any one time. Furthermore, although the multi-bus component 340 is shown as an independent component, it can be integrated with the synthesizer component 338, or with the audio buffers component 342.

Exemplary Audio Generation System Buffers

Figure 5:
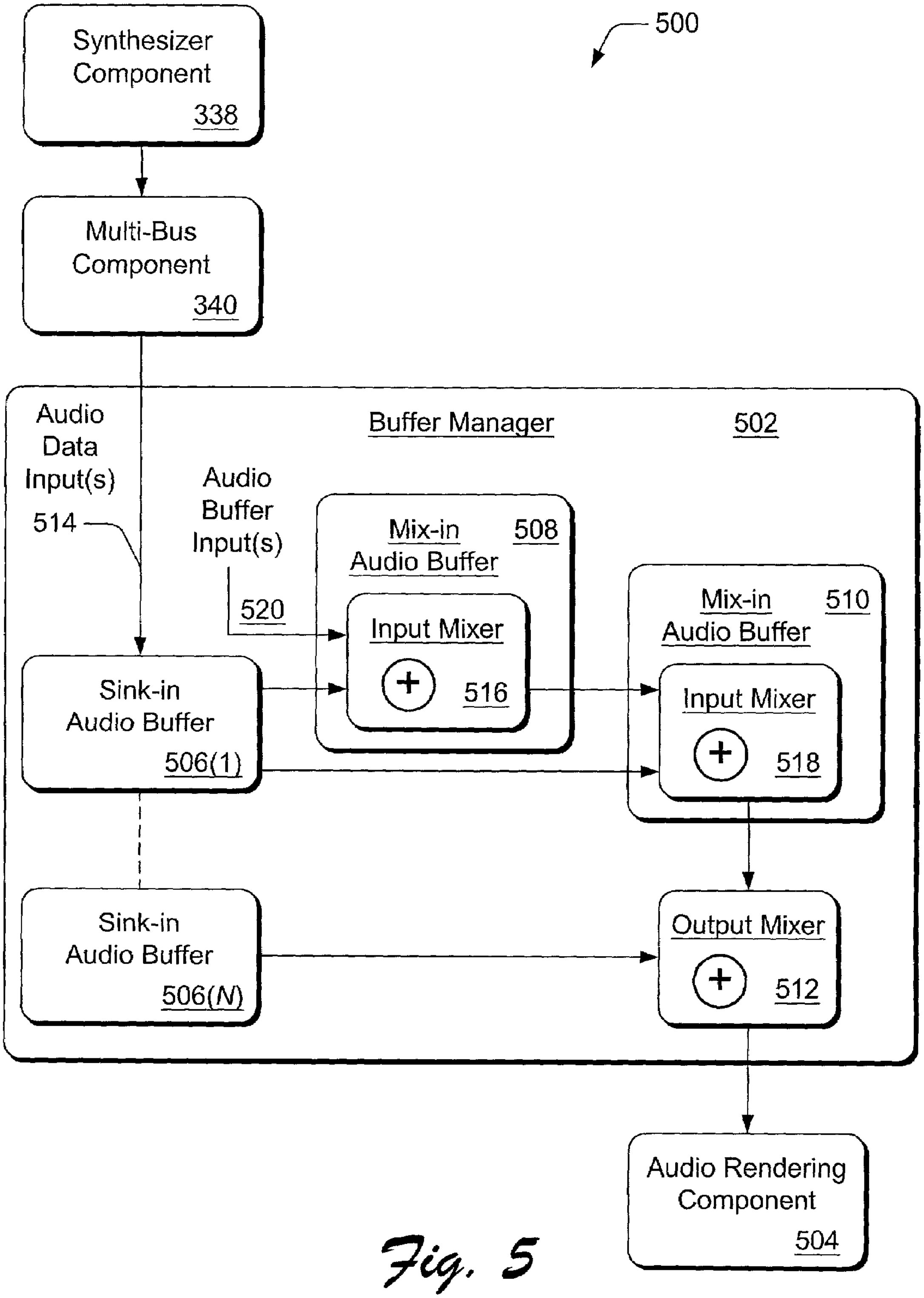
FIG. 5 illustrates an exemplary audio buffer system.

FIG. 5 illustrates an exemplary audio buffer system 500 that includes an audio buffer manager 502 and audio rendering component(s) 504. Buffer manager 502 includes multiple sink-in audio buffers 506(1) through 506(N), a first mix-in audio buffer 508, a second mix-in audio buffer 510, and an output mixer component 512. As used herein, an audio buffer is the software and/or hardware system resources reserved and implemented to communicate a stream of audio data from an audio source component or application program to audio rendering components of a computing system via audio output ports of the computing system.

Sink-in audio buffers 506(1) through 506(N) receive one or more streams of audio data input(s) 514 from an audio source component such as synthesizer component 338 via logical buses of the multi-bus component 340. Although not shown, sink-in audio buffers 506 can also receive streams of audio data from another audio buffer, a file, and/or an audio data resource. An audio source component can be any component that generates audio segments, such as a DirectMusic® component, a software synthesizer, or an audio file decoder. Sink-in audio buffers 506 can be implemented as looping audio buffers that will continue to request and communicate streams of audio data until stopped by a control component, such as a buffer manager or an application program. A conventional static, or non-looping, audio buffer plays an audio source once and stops automatically.

Mix-in audio buffers 508 and 510 each include an input mixer component 516 and 518, respectively, which receives streams of audio data from multiple sending audio buffers at one time and combines the streams of audio data into a single stream of combined audio data prior to further processing. The mix-in audio buffers 508 and 510 receive streams of audio data from one or more sink-in audio buffers and/or from other mix-in audio buffers. For example, mix-in audio buffer 508 receives a stream of audio data from sink-in audio buffer 506(1) and receives one or more inputs 520 at input mixer 516. Mix-in audio buffer 508 generates a stream of combined audio data that includes the streams of audio data received from the one or more inputs 520 and from sink-in audio buffer 506(1). Further, mix-in audio buffer 510 also receives a stream of audio data from sink-in audio buffer 506(1) and from mix-in audio buffer 508. Mix-in audio buffer 510 generates a stream of combined audio data that includes the streams of audio data received from sink-in audio buffer 506(1) and from mix-in audio buffer 508.

Sink-in audio buffer 506(N) outputs and communicates a stream of audio data to output mixer 512, and mix-in audio buffer 518 outputs and communicates a stream of combined audio data to output mixer 512. Output mixer 512 can be implemented as a primary audio buffer that maintains, mixes, and streams the audio that a listener will hear when an audio rendering component 504 produces an audio rendition of the corresponding audio data. The sink-in audio buffers 506(1) through 506(N), and the mix-in audio buffers 508 and 510, can be implemented as secondary audio buffers that route streams of audio data to the output mixer 512. The output mixer 512 streams the audio sound waves for input to an audio rendering component 504. Audio corresponding to different audio buffers can be mixed by playing the different audio buffers at the same time, and any number of audio buffers can be played at one time.

Mix-in audio buffers 508 and 510 serve as intermediate mixing locations for multiple audio buffers, prior to a final mix of all the audio buffer outputs together in the output mixer 512. The mix-in audio buffers improve computing system CPU (central processing unit) efficiency by mixing and processing the audio data in intermediate stages.

In response to an application program request, such as a multimedia game program, buffer manager 502 creates mix-in audio buffers 508 and 510, and the sink-in audio buffers 506. Further, buffer manager 502 requests streams of audio data from the audio data source for input to the sink-in audio buffers 506. Buffer manager 502 coordinates the availability of the sink-in audio buffers 506(1) through 506(N) to receive audio data input(s) 514 from synthesizer component 338. As described herein, creating or otherwise defining an audio buffer describes reserving various hardware and/or software resources to implement an audio buffer. Further, the audio buffers can be instantiated as programming objects each having an interface that is callable by the buffer manager and/or by an application program. An audio buffer object represents an audio buffer containing sound data, or audio data, and the buffer object can be referenced to start, stop, and pause sound playback, as well as to set attributes such as frequency and format of the sound.

Playing an audio buffer that is instantiated as a programming object includes executing an API method to initiate sound transmission on the audio buffer, which may include reading and processing data from the buffer's audio source. Although not shown, audio buffer manager 500 can also include static buffers that are created and managed within buffer manager 500 along with the sink-in audio buffers and the mix-in audio buffers. The static buffers are typically written to once and then played, whereas the sink-in audio buffers and mix-in audio buffers are streaming audio buffers that are continually provided with audio data while they are playing.

Buffer manager 502 creates and deactivates the sink-in audio buffers 506 and the mix-in audio buffers 508 and 510 according to creation and deletion ordering rules because the audio buffers are dynamically created and removed from the buffer architecture while audio for an application program is playing. A mix-in audio buffer is defined before the one or more buffers that input audio data to the mix-in audio buffer are defined. For example, mix-in audio buffer 510 in buffer manager 502 is defined before mix-in audio buffer 508 and before sink-in audio buffer 506(1), both of which input audio data to mix-in audio buffer 510. Similarly, mix-in audio buffer 508 is defined before sink-in audio buffer 506(1) which inputs audio data to mix-in audio buffer 508. When the audio buffers are deactivated, the computing system resources reserved for the audio buffers are released in a reverse order. For example, sink-in audio buffer 506(1) is deactivated before mix-in audio buffer 508, and mix-in audio buffer is deactivated before mix-in audio buffer 510.

A digital sample of an audio source stored in a wave file (i.e., a wav file) can be played through audio buffers in buffer manager 502 without audio processing the wave sound in an audio rendition manager by playing the wave sound directly to audio buffers. However, the features of the audio generation systems described herein allow that a wave sound can be loaded as a segment and played through a performance manager as part of an overall performance. Playing a wave sound through a performance manager provides a tighter integration of sound effects and music, and provides greater audio processing functionality such as the ability to mix sounds on an AudioPath (i.e., audio rendition manager) before the sounds are input to an audio buffer.

File Format and Component Instantiation

Audio sources and audio generation systems can be pre-authored which makes it easy to develop complicated audio representations and generate music and sound effects without having to create and incorporate specific programming code for each instance of an audio rendition of a particular audio source. For example, audio rendition manager 206 (FIG. 3) and the associated audio data processing components can be instantiated from an audio rendition manager configuration data file (not shown).

A segment data file can also contain audio rendition manager configuration data within its file format representation to instantiate audio rendition manager 206. When a segment 414, for example, is loaded from a segment data file, the audio rendition manager 206 is created. Upon playback, the audio rendition manager 206 defined by the configuration data is automatically created and assigned to segment 414. When the audio corresponding to segment 414 is rendered, it releases the system resources allocated to instantiate audio rendition manager 206 and the associated components.

Configuration information for an audio rendition manager object, and the associated component objects for an audio generation system, is stored in a file format such as the Resource Interchange File Format (RIFF). A RIFF file includes a file header that contains data describing the object followed by what are known as "chunks." Each of the chunks following a file header corresponds to a data item that describes the object, and each chunk consists of a chunk header followed by actual chunk data. A chunk header specifies an object class identifier (CLSID) that can be used for creating an instance of the object. Chunk data consists of the data to define the corresponding data item. Those skilled in the art will recognize that an extensible markup language (XML) or other hierarchical file format can be used to implement the component objects and the audio generation systems described herein.

A RIFF file for a mapping component and a synthesizer component has configuration information that includes identifying the synthesizer technology designated by source input audio instructions. An audio source can be designed to play on more than one synthesis technology. For example, a hardware synthesizer can be designated by some audio instructions from a particular source, for performing certain musical instruments for example, while a wavetable synthesizer in software can be designated by the remaining audio instructions for the source.

The configuration information defines the synthesizer channels and includes both a synthesizer channel-to-buffer assignment list and a buffer configuration list stored in the synthesizer configuration data. The synthesizer channel-to-buffer assignment list defines the synthesizer channel sets and the buffers that are designated as the destination for audio wave data output from the synthesizer channels in the channel group. The assignment list associates buffers according to buffer global unique identifiers (GUIDs) which are defined in the buffer configuration list.

Defining the audio buffers by buffer GUIDs facilitates the synthesizer channel-to-buffer assignments to identify which audio buffer will receive audio wave data from a synthesizer channel. Defining audio buffers by buffer GUIDs also facilitates sharing resources such that more than one synthesizer can output audio wave data to the same buffer. When an audio buffer is instantiated for use by a first synthesizer, a second synthesizer can output audio wave data to the audio buffer if it is available to receive data input. The audio buffer configuration list also maintains flag indicators that indicate whether a particular audio buffer can be a shared resource or not.

The configuration information also includes a configuration list that contains the information to allocate and map audio instruction input channels to synthesizer channels. A particular RIFF file also has configuration information for a multi-bus component and an audio buffers component that includes data describing an audio buffer object in terms of a buffer GUID, a buffer descriptor, the buffer function and associated audio effect processors, and corresponding logical bus identifiers. The buffer GUID uniquely identifies each audio buffer and can be used to determine which synthesizer channels connect to which audio buffers. By using a unique audio buffer GUID for each buffer, different synthesizer channels, and channels from different synthesizers, can connect to the same buffer or uniquely different ones, whichever is preferred.

The instruction processors, mapping, synthesizer, multi-bus, and audio buffers component configurations support COM interfaces for reading and loading the configuration data from a file. To instantiate the components, an application program and/or a script file instantiates a component using a COM function. The components of the audio generation systems described herein can be implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

To create the component objects of an audio generation system, the application program calls a load method for an object and specifies a RIFF file stream. The object parses the RIFF file stream and extracts header information. When it reads individual chunks, it creates the object components, such as synthesizer channel group objects and corresponding synthesizer channel objects, and mapping channel blocks and corresponding mapping channel objects, based on the chunk header information.

Methods for Audio Buffer Systems

Although the audio generation and audio buffer systems have been described above primarily in terms of their components and their characteristics, the systems also include methods performed by a computer or similar device to implement the features described above.

Figure 6:
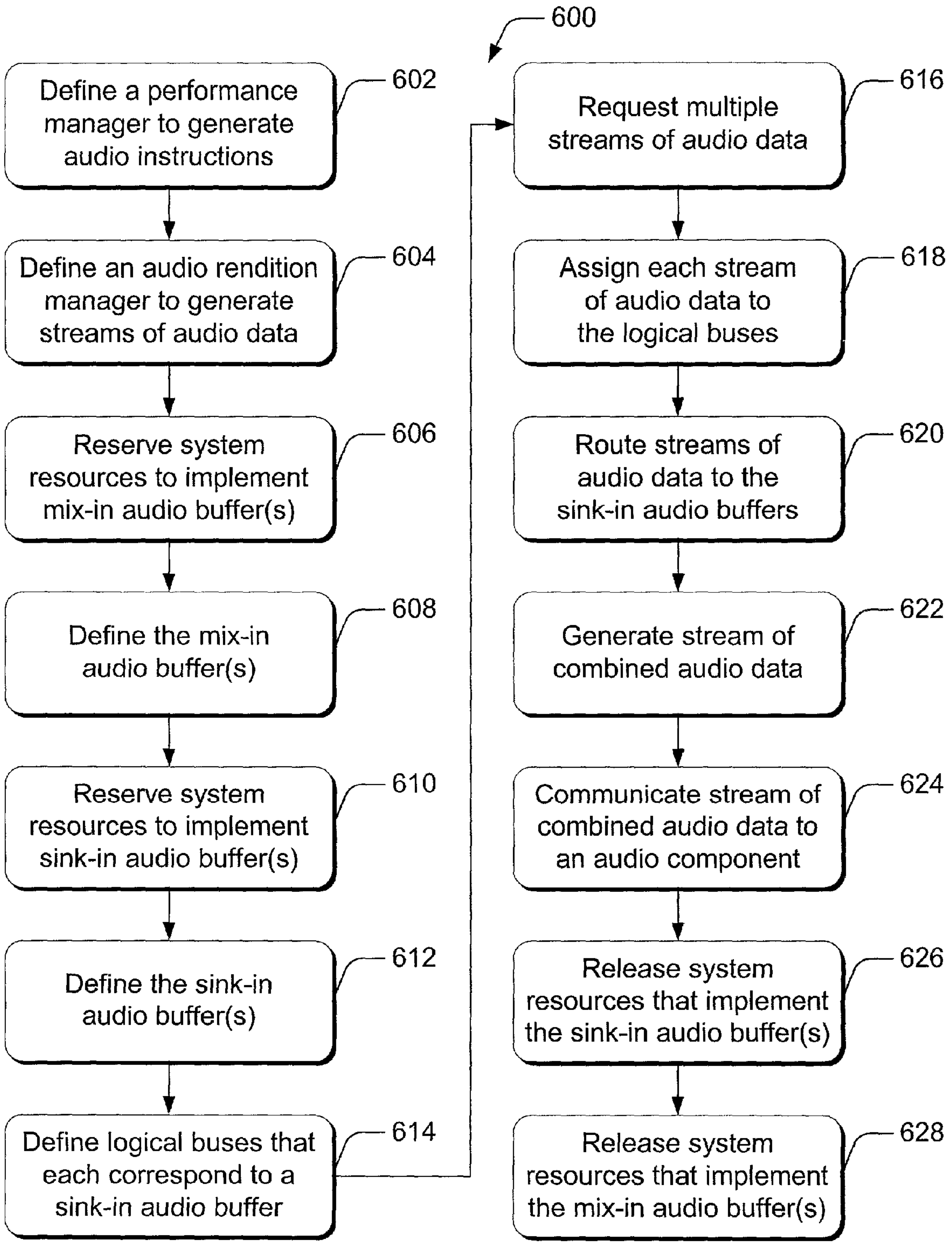
FIG. 6 is a flow diagram of a method for dynamic audio buffer creation.

FIG. 6 illustrates a method 600 for dynamic audio buffer creation. The method is illustrated as a set of operations shown as discrete blocks, and the order in which the method is described is not intended to be construed as a limitation. Furthermore, the method can be implemented in any suitable hardware, software, firmware, or combination thereof.

At block 602, a performance manager is defined to generate audio instructions. For example, performance manager 204 (FIG. 3) includes an audio segment 314 with audio content components 322 (e.g., the segment tracks) which generate the audio instructions, such as synthesizer MIDI instructions. At block 604, an audio rendition manager is defined to process the audio instructions and generate multiple streams of audio data. For example, audio rendition manager 206 (FIG. 3) includes synthesizer component 338 which processes the audio instructions to generate the multiple streams of audio data.

At block 606, computing system resources are reserved to implement one or more mix-in audio buffers, and at block 608, the mix-in audio buffers are defined such that a mix-in audio buffer receives one or more streams of audio data from one or more sink-in audio buffers. A mix-in audio buffer can be instantiated as a programming object having an interface that is callable to route the one or more streams of audio data received from the one or more sink-in audio buffers. A mix-in audio buffer is defined before the one or more sink-in audio buffers that input audio data to the mix-in audio buffer are defined. For example, mix-in audio buffer 510 in buffer manager 502 (FIG. 5) is defined before mix-in audio buffer 508 and before sink-in audio buffer 506(1) are defined, both of which input audio data to mix-in audio buffer 510. Similarly, mix-in audio buffer 508 is defined before sink-in audio buffer 506(1) is defined which inputs audio data to mix-in audio buffer 508.

At block 610, computing system resources are reserved to implement one or more sink-in audio buffers, and at block 612, the sink-in audio buffers are defined such that each sink-in audio buffer receives one or more of the multiple streams of audio data. A sink-in audio buffer can be instantiated as a programming object having an interface that is callable to route the one or more multiple streams of audio data to the sink-in audio buffer. For example, sink-in audio buffers 506 in buffer manager 502 (FIG. 5) are defined to receive audio data input(s) 514.

At block 614, logical buses that each correspond to a sink-in audio buffer are defined. For example, multi-bus component 340 (FIG. 4) includes logical buses 414 that receive audio data from synthesizer component 338 and route the audio data to audio buffers 416 in the audio buffers component 342.

At block 616, multiple streams of audio data are requested. For example, buffer manager 502 (FIG. 5) requests audio data inputs 514 from synthesizer component 338 for input to the sink-in audio buffers 506. At block 618, each of the multiple streams of audio data are assigned to one or more of the logical buses, and at block 620, the streams of audio data assigned to a particular logical bus are routed to the sink-in audio buffer corresponding to the particular logical bus.

At block 622, a mix-in audio buffer generates a stream of combined audio data that includes one or more streams of audio data received from one or more sink-in audio buffers and/or includes one or more streams of combined audio data received from one or more mix-in audio buffers. For example, mix-in audio buffer 508 receives an audio input from sink-in audio buffer 506(1) and from the other audio buffer inputs 520, and generates a stream of combined audio data with input mixer 516. Similarly, mix-in audio buffer 510 receives an audio input from sink-in audio buffer 506(1) and receives the stream of combined audio data from mix-in audio buffer 508, and further generates a stream of combined audio data with input mixer 518 in mix-in audio buffer 510.

At block 624, a stream of combined audio data is communicated to an audio component, such as a speaker for example, that produces an audio rendition corresponding to the stream of combined audio data. At block 626, the computing system resources that implement the one or more sink-in audio buffers are released, and at block 628, the computing system resources that implement the one or more mix-in audio buffers are released.

Audio Generation System Component Interfaces and Methods

Embodiments of the invention are described herein with emphasis on the functionality and interaction of the various components and objects. The following sections describe specific interfaces and interface methods that are supported by the various objects.

A Loader interface (IDirectMusicLoader8) is an object that gets other objects and loads audio rendition manager configuration information. It is generally one of the first objects created in a DirectX® audio application. DirectX® is an API available from Microsoft Corporation, Redmond Washington. The loader interface supports a LoadObjectFromFile method that is called to load all audio content, including DirectMusic® segment files, DLS (downloadable sounds) collections, MIDI files, and both mono and stereo wave files. It can also load data stored in resources. Component objects are loaded from a file or resource and incorporated into a performance. The Loader interface is used to manage the enumeration and loading of the objects, as well as to cache them so that they are not loaded more than once.

Audio Rendition Manager Interface and Methods

An AudioPath interface (IDirectMusicAudioPath8) represents the routing of audio data from a performance component to the various component objects that comprise an audio rendition manager. The AudioPath interface includes the following methods:

An Activate method is called to specify whether to activate or deactivate an audio rendition manager. The method accepts Boolean parameters that specify "TRUE" to activate, or "FALSE" to deactivate.

A ConvertPChannel method translates between an audio data channel in a segment component and the equivalent performance channel allocated in a performance manager for an audio rendition manager. The method accepts a value that specifies the audio data channel in the segment component, and an address of a variable that receives a designation of the performance channel.

A SetVolume method is called to set the audio volume on an audio rendition manager. The method accepts parameters that specify the attenuation level and a time over which the volume change takes place.

A GetObjectInPath method allows an application program to retrieve an interface for a component object in an audio rendition manager. The method accepts parameters that specify a performance channel to search, a representative location for the requested object in the logical path of the audio rendition manager, a CLSID (object class identifier), an index of the requested object within a list of matching objects, an identifier that specifies the requested interface of the object, and the address of a variable that receives a pointer to the requested interface.

The GetObjectInPath method is supported by various component objects of the audio generation system. The audio rendition manager, segment component, and audio buffers in the audio buffers component, for example, each support the getObject interface method that allows an application program to access and control the audio data processing component objects. The application program can get a pointer, or programming reference, to any interface (API) on any component object in the audio rendition manager while the audio data is being processed.

Real-time control of audio data processing components is needed, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Performance Manager Interface and Methods

A Performance interface (IDirectMusicPerformance8) represents a performance manager and the overall management of audio and music playback. The interface is used to add and remove synthesizers, map performance channels to synthesizers, play segments, dispatch event instructions and route them through event instructions, set audio parameters, and the like. The Performance interface includes the following methods:

A CreateAudioPath method is called to create an audio rendition manager object. The method accepts parameters that specify an address of an interface that represents the audio rendition manager configuration data, a Boolean value that specifies whether to activate the audio rendition manager when instantiated, and the address of a variable that receives an interface pointer for the audio rendition manager.

A CreateStandardAudioPath method allows an application program to instantiate predefined audio rendition managers rather than one defined in a source file. The method accepts parameters that specify the type of audio rendition manager to instantiate, the number of performance channels for audio data, a Boolean value that specifies whether to activate the audio rendition manager when instantiated, and the address of a variable that receives an interface pointer for the audio rendition manager.

A PlaySegmentEx method is called to play an instance of a segment on an audio rendition manager. The method accepts parameters that specify a particular segment to play, various flags, and an indication of when the segment instance should start playing. The flags indicate details about how the segment should relate to other segments and whether the segment should start immediately after the specified time or only on a specified type of time boundary. The method returns a memory pointer to the state object that is subsequently instantiated as a result of calling PlaySegmentEx.

A StopEx method is called to stop the playback of audio on an component object in an audio generation system, such as a segment or an audio rendition manager. The method accepts parameters that specify a pointer to an interface of the object to stop, a time at which to stop the object, and various flags that indicate whether the segment should be stopped on a specified type of time boundary.

Segment Component Interface and Methods

A Segment interface (IDirectMusicSegment8) represents a segment in a performance manager which is comprised of multiple tracks. The Segment interface includes the following methods:

A Download method to download audio data to a performance manager or to an audio rendition manager. The term "download" indicates reading audio data from a source into memory. The method accepts a parameter that specifies a pointer to an interface of the performance manager or audio rendition manager that receives the audio data.

An Unload method to unload audio data from a performance manager or an audio rendition manager. The term "unload" indicates releasing audio data memory back to the system resources. The method accepts a parameter that specifies a pointer to an interface of the performance manager or audio rendition manager.

A GetAudioPathConfig method retrieves an object that represents audio rendition manager configuration data embedded in a segment. The object retrieved can be passed to the CreateAudioPath method described above. The method accepts a parameter that specifies the address of a variable that receives a pointer to the interface of the audio rendition manager configuration object.

Audio Buffer Interface and Methods

An IDirectSound8 interface has a CreateSoundBuffer method that returns a pointer to an IDirectSoundBuffer8 interface which an application uses to manipulate and play a buffer.

The CreateSoundBuffer method creates an audio buffer object to maintain a sequence of audio samples. The method accepts parameters that specify an address of a buffer description data structure that describes an audio buffer configuration (DSBufferDesc), an address of a variable that receives the IDirectSoundBuffer8 interface of the newly created audio buffer object (DSBuffer), and an address of the controlling object's IUnknown interface for COM aggregation.

Exemplary Computing System and Environment

Figure 7:
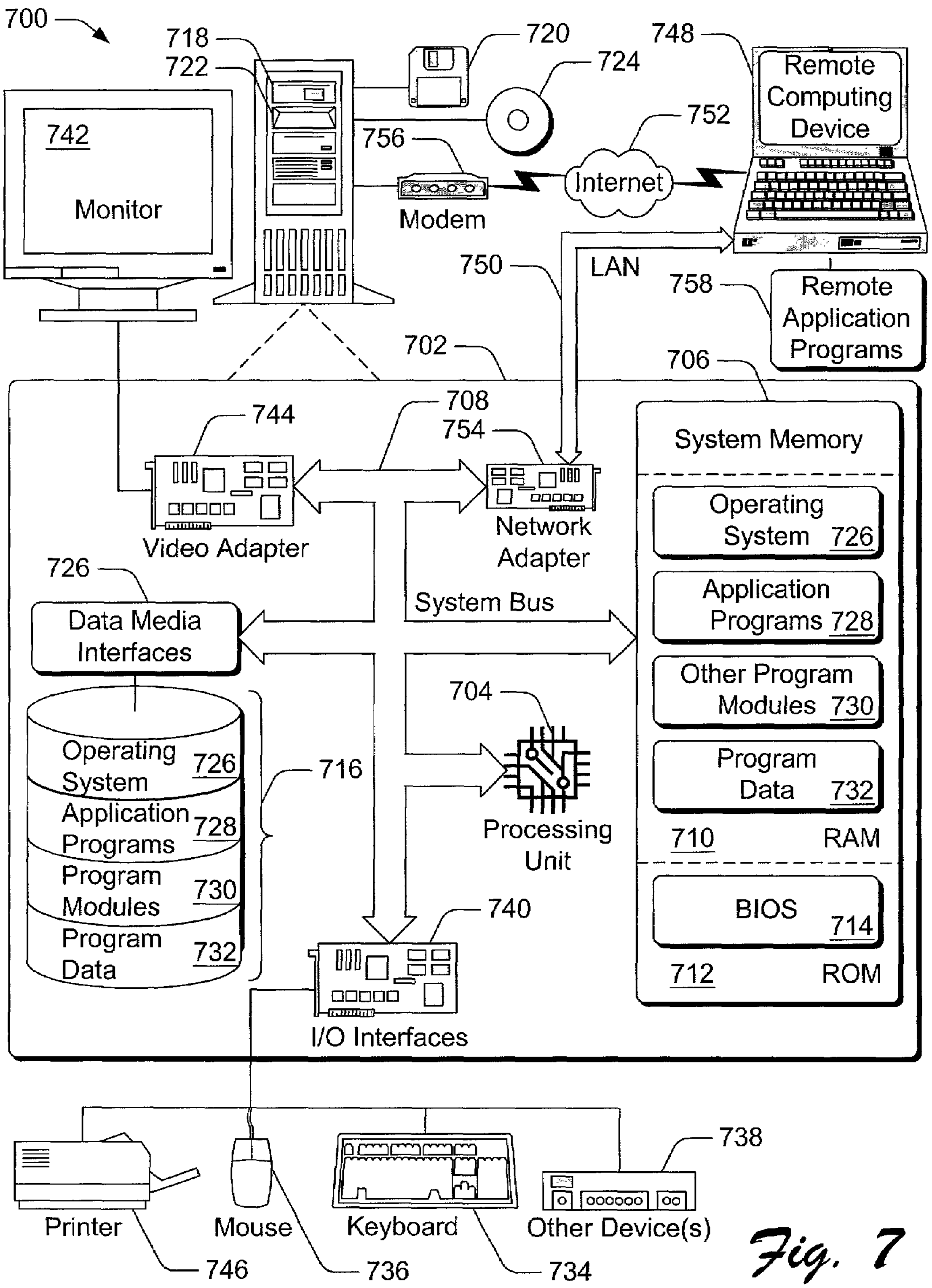
FIG. 7 is a diagram of computing systems, devices, and components in an environment that can be used to implement the systems and methods described herein.

FIG. 7 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Audio generation may be described in the general context of computer-executable instructions, such as program modules, being executed by a computer. Generally, program modules include routines, programs, objects, components, data structures, etc. that perform particular tasks or implement particular abstract data types. Audio generation may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of an audio generation system.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

Although the systems and methods have been described in language specific to structural features and/or procedures, it is to be understood that the invention defined in the appended claims is not necessarily limited to the specific features or procedures described. Rather, the specific features and procedures are disclosed as preferred forms of implementing the claimed invention.

The invention claimed is:

1. An audio generation system, comprising:

an audio rendition manager corresponding to an audio rendition generated from audio data, the audio rendition manager including a synthesizer component, audio buffers, and logical buses that each correspond to one of the audio buffers;

a buffer manager configured to create the audio buffers that receive one or more streams of the audio data generated by the synthesizer component, where each of stream of audio data is assigned to one or more of the logical buses that receive the audio data from the synthesizer component such that the audio data steams assigned to a particular logical bus are routed to an audio buffer that corresponds to the particular logical bus;

a sink-in audio buffer created by the buffer manager and configured to receive a steam of the audio data, the buffer manager further configured to request the steam of audio data from a corresponding logical bus for input to the sink-in audio buffer; and an audio component configured to receive modified audio data from the sink-in audio buffer and produce the audio rendition corresponding to the modified audio data.

2. An audio generation system as recited in claim 1, further comprising a mix-in audio buffer created by the buffer manager and configured to:

receive streams of audio data from one or more sink-in audio buffers;

generate a stream of combined audio data that includes the streams of audio data received from the one or more sink-in audio buffers; and communicate the stream of combined audio data to the audio component to produce an audio rendition conesponding to the stream of combined audio data.

3. An audio generation system as recited in claim 1, wherein the sink-in audio buffer is instantiated as a programming object having an interface that is callable by a software component.

4. An audio generation system as recited in claim 1, wherein the sink-in audio buffer is instantiated as a programming object having an interface that is callable by a multimedia application to receive the stream of audio data.

5. An audio generation system as recited in claim 1, wherein the sink-in audio buffer is further configured to receive at least a second stream of the audio data, the buffer manager further configured to request the second stream of audio data from a corresponding logical bus for input to the sink-in audio buffer.

6. An audio generation system as recited in claim 1, further comprising a mix-in audio buffer created by the buffer manager and configured to:

receive streams of audio data from one or more sink-in audio buffers which are created by the buffer manager after the mix-in audio buffer is created;

generate a stream of combined audio data that includes the streams of audio data received from the one or more sink-in audio buffers; and communicate the stream of combined audio data to the audio component to produce an audio rendition corresponding to the stream of combined audio data.

7. An audio generation system as recited in claim 1, further comprising a mix-in audio buffer created by the buffer manager and configured to:

receive streams of audio data from one or more sink-in audio buffers which are created by the buffer manager after the mix-in audio buffer is created;

generate a stream of combined audio data that includes the streams of audio data received from the one or more sink-in audio buffers; and wherein the buffer manager deactivates the one or more sink-in audio buffers before the mix-in audio buffer is deactivated.

8. An audio generation system as recited in claim 1, further comprising:

at least a second sink-in audio buffer created by the buffer manager and configured to receive a second stream of the audio data, the buffer manager further configured to request the second stream of audio data from a corresponding logical bus for input to the second sink-in audio buffer; and a mix-in audio buffer created by the buffer manager and configured to:

generate a stream of combined audio data that includes audio data received from the sink-in audio buffer, and that includes audio data received from the second sink-in audio buffer; and communicate the stream of combined audio data to the audio component to produce an audio rendition corresponding to the stream of combined audio data.

9. An audio generation system as recited in claim 1, wherein the audio rendition manager is a programming object having an interface that is callable by a software component to generate the audio data.

10. An audio generation system as recited in claim 1, wherein the synthesizer component is instantiated as a programming object having an interface that is callable by a multimedia application to generate the audio data.

11. An audio generation system as recited in claim 1, wherein the synthesizer component is instantiated as a programming object having an interface that is callable by a multimedia application to generate the audio data in response to MIDI instructions.

12. An audio generation system as recited in claim 1, wherein the buffer manager is a programming object having an interface that is callable by a software component to create the audio buffers.

13. An audio generation system as recited in claim 1, wherein the buffer manager is a programming object having an interface that is callable by a multimedia application to create the audio buffers.

14. An audio generation system as recited in claim 1, further comprising a software component that defines the one or more logical buses corresponding to the sink-in audio buffer.

15. An audio generation system as recited in claim 1, further comprising a performance manager that includes at least one audio segment having audio content components that are each configured to generate audio instructions; and wherein the audio rendition manager includes the synthesizer component configured to process the audio instructions to generate the audio data.

16. An audio generation system as recited in claim 1, further comprising a performance manager that includes at least one audio segment having audio content components that are each configured to generate MIDI instructions; and wherein the audio rendition manager includes the synthesizer component configured to process the MIDI instructions to generate the audio data.

17. An audio generation system, comprising:

an audio rendition manager corresponding to an audio rendition generated from audio data, the audio rendition manager including a synthesizer component, audio buffers, and logical buses that each correspond to one of the audio buffers;

sink-in audio buffers each configured to receive one or more streams of audio data generated by the synthesizer component, where each stream of audio data is assigned to one or more of the logical buses that receive the audio data from the synthesizer component such that the audio data streams assigned to a particular logical bus are routed to a sink-in audio buffer that corresponds to the particular logical bus; and a mix-in audio buffer configured to receive the audio data from one or more of the sink-in audio buffers, the mix-in audio buffer further configured to generate a stream of combined audio data that includes the audio data received from the one or more sink-in audio buffers.

18. An audio generation system as recited in claim 17, further comprising an audio component configured to receive the stream of combined audio data from the mix-in audio buffer and produce an audio rendition corresponding to the stream of combined audio data.

19. An audio generation system as recited in claim 17, further comprising at least a second mix-in audio buffer configured to generate a second stream of combined audio data that includes the stream of combined audio data received from the mix-in audio buffer, and that includes one or more streams of audio data received from one or more of the sink-in audio buffers.

20. An audio generation system as recited in claim 17, further comprising a buffer manager configured to create the mix-in audio buffer and the sink-in audio buffers.

21. An audio generation system as recited in claim 17, further comprising a buffer manager configured to create the mix-in audio buffer and the sink-in audio buffers, the buffer manager further configured to request the one or more streams of audio data from the corresponding logical buses for input to each of the one or more sink-in audio buffers.

22. An audio generation system as recited in claim 17, further comprising a buffer manager configured to create the sink-in audio buffers and the mix-in audio buffer, the mix-in audio buffer being created before the one or more sink-in audio buffers are created to input the audio data into the mix-in audio buffer.

23. An audio generation system as recited in claim 17, further comprising a buffer manager configured to:

create the sink-in audio buffers and the mix-in audio buffer, the mix-in audio buffer being created before the one or more sink-in audio buffers are created to input the audio data into the mix-in audio buffer; and deactivate the one or more sink-in audio buffers before the mix-in audio buffer is deactivated.

24. An audio generation system as recited in claim 17, further comprising a buffer manager configured to:

implement resources to create the sink-in audio buffers and the mix-in audio buffer, the mix-in audio buffer being created before the one or more sink-in audio buffers are created to input the audio data into the mix-in audio buffer; and release the resources implemented to create the one or more sink-in audio buffers before the resources implemented to create the mix-in audio buffer are released.

25. An audio generation system as recited in claim 17, further comprising a buffer manager instantiated as a programming object having an interface that is callable by a software component, the buffer manager configured to:

instantiate the mix-in audio buffer as a programming object having an interface that is callable by the software component; and instantiate each of the sink-in audio buffers as a programming object having an interface that is callable by the software component.

26. An audio generation system as recited in claim 17, further comprising a buffer manager instantiated as a programming object having an interface that is callable by a multimedia application, the buffer manager configured to:

instantiate the mix-in audio buffer as a programming object in response to a request from the multimedia application to communicate a stream of audio data from the sink-in audio buffer to the mix-in audio buffer; and instantiate a sink-in audio buffer as a programming object in response to a request from the multimedia application to communicate a stream of audio data from a corresponding logical bus to the sink-in audio buffer.

27. An audio generation system as recited in claim 17, further comprising a buffer manager instantiated as a programming object having an interface that is callable by a multimedia application, the buffer manager configured to:

instantiate the mix-in audio buffer as a programming object in response to a request from the multimedia application to communicate a stream of audio data from the sink-in audio buffer to the mix-in audio buffer;

instantiate a sink-in audio buffer as a programming object in response to a request from the multimedia application to communicate a stream of audio data from a corresponding logical bus to the sink-in audio buffer; and request the stream of audio data from the corresponding logical bus for input to the sink-in audio buffer.

28. An audio generation system as recited in claim 17, further comprising a software component that defines the one or more logical buses corresponding respectively to one or more of the sink-in audio buffers.

29. An audio generation system as recited in claim 17, further comprising a software component that defines the logical buses corresponding to the sink-in audio buffers, each logical bus configured to receive the one or more streams of audio data from the synthesizer component and communicate the one or more streams of audio data to the corresponding sink-in audio buffer.

30. An audio generation system as recited in claim 17, further comprising a performance manager that includes at least one audio segment having one or more audio content components that are each configured to generate audio instructions; and wherein the audio rendition manager includes the synthesizer component configured to process the audio instructions to generate the one or more streams of audio data.

31. An audio generation system as recited in claim 17, further comprising a performance manager that includes at least one audio segment having one or more audio content components that are each configured to generate MIDI instructions; and wherein the audio rendition manager includes the synthesizer component configured to process the MIDI instructions to generate the one or more streams of audio data.

32. A method, comprising:

requesting multiple streams of audio data from audio rendition managers that each correspond to an audio rendition, an audio rendition manager including a synthesizer component, audio buffers, and logical buses that each correspond to one of the audio buffers;

defining sink-in audio buffers that each receive one or more of the multiple streams of audio data from the synthesizer component, where each stream of audio data is assigned to one or more of the logical buses that receive the audio data from the synthesizer component such that the audio data streams assigned to a particular logical bus are routed to a sink-in audio buffer that corresponds to the particular logical bus;

defining a mix-in audio buffer to receive one or more streams of audio data from one or more of the sink-in audio buffers; and generating a stream of combined audio data that includes the one or more streams of audio data received from the one or more sink-in audio buffers.

33. A method as recited in claim 32, further comprising communicating the stream of combined audio data to an audio component that produces an audio rendition corresponding to the stream of combined audio data.

34. A method as recited in claim 32, further comprising generating the multiple streams of audio data when receiving audio instructions.

35. A method as recited in claim 32, further comprising generating the multiple streams of audio data when receiving synthesizer MIDI instructions.

36. A method as recited in claim 32, wherein defining the sink-in audio buffers comprises instantiating each sink-in audio buffer as a programming object having an interface that is callable to route the one or more multiple steams of audio data.

37. A method as recited in claim 32, wherein defining the mix-in audio buffer comprises instantiating the mix-in audio buffer as a programming object having an interface that is callable to route the one or more streams of audio data received from the one or more sink-in audio buffers.

38. A method as recited in claim 32, wherein defining the sink-in audio buffers comprises reserving computing system resources to implement each sink-in audio buffer to receive the one or more multiple streams of audio data.

39. A method as recited in claim 32, wherein defining the mix-in audio buffer comprises reserving computing system resources to implement the mix-in audio buffer to receive the one or more steams of audio data received from the one or more sink-in audio buffers.

40. A method as recited in claim 32, wherein the mix-in audio buffer is defined before the one or more sink-in audio buffers are defined.

41. A method as recited in claim 32, wherein defining the mix-in audio buffer comprises reserving computing system resources to impitment the mix-in audio buffer before defining the sink-in audio buffers which comprises reserving computing system resources to implement each sink in audio buffer.

42. A method as recited in claim 32, wherein defining the mix-in audio buffer comprises reserving computing system resources to implement the mix-in audio buffer before defining the sink-in audio buffers which comprises reserving computing system resources to implement each sink-in audio buffer, and the method further comprising:

releasing the computing system resources that implement the sink-in audio buffers before releasing the computing resources that implement the mix-in audio buffer.

43. A method as recited in claim 32, further comprising defining a second mix-in audio buffer to receive the stream of combined audio data from the mix-in audio buffer, and to receive one or more streams of audio data from one or more of the sink-in audio buffers.

44. A method as recited in claim 32, further comprising:

defining a second mix-in audio buffer to receive the stream of combined audio data from the mix-in audio buffer, and to receive one or more streams of audio data from one or more of the sink-in audio buffers;

generating a second stream of combined audio data that includes the stream of combined audio data, and includes the one or more streams of audio data; and communicating the second stream of combined audio data to an audio component that produces an audio rendition corresponding to the second stream of combined audio data.

45. A method as recited in claim 32, further comprising:

defining a performance manager to generate audio instructions; and defining an audio rendition manager to process the audio instructions and generate the multiple streams of audio data.

46. A method as recited in claim 32, further comprising:

defining a performance manager having an audio segment with one or more audio content components, the one or more audio content components generating audio instructions; and defining the audio rendition manager having the synthesizer component to process the audio instructions to generate the multiple streams of audio data.

47. One or more computer-readable storage media encoded with computer-executable instructions that, when executed, direct a computing system to perform the method of claim 32.

48. One or more computer-readable storage media encoded with computer executable instructions that, when executed, direct a computing system to:

generate audio data with a synthesizer component when receiving audio instructions, an audio rendition manager including the synthesizer component, audio buffers, and logical buses that each correspond to one of the audio buffers;

instantiate a sink-in audio buffer as a programming object having an interface that is callable by a software component, the sink-in audio buffer receiving audio data from the synthesizer component where streams of the audio data are assigned to one or more of the logical buses that receive the audio data from the synthesizer component such that the audio data streams assigned to a particular logical bus are routed to the sink-in audio buffer that corresponds to the particular logical bus;

stream the audio data to the sink-in audio buffer when the audio data is requested for input by the software component; and communicate the audio data to an audio component that produces an audio rendition corresponding to the audio data.

49. One or more computer-readable storage media as recited in claim 48, further encoded with computer executable instructions that, when executed, direct the computing system to instantiate a mix-in audio buffer as a programming object having an interface that is callable by the software component, the mix-in audio buffer generating a stream of combined audio data that includes audio data received from one or more sink-in audio buffers.

50. One or more computer-readable storage media as recited in claim 48, further encoded with computer executable instructions that, when executed, direct the computing system to:

instantiate a mix-in audio buffer as a programming object having an interface that is callable by the software component the mix-in audio buffer generating a stream of combined audio data that includes audio data received from one or more sink-in audio buffers; and communicate the stream of combined audio data to the audio component that produces an audio rendition corresponding to the stream of combined audio data.

51. One or more computer-readable storage media as recited in claim 48, further encoded with computer executable instructions that, when executed, direct the computing system to:

instantiate a performance manager having an audio segment with one or more audio content components, the one or more audio content components generating audio instructions; and instantiate the audio rendition manager that includes the synthesizer component to process the audio instructions to generate the audio data.

* * * * *